(12) United States Patent
Seil et al.

(10) Patent No.: US 7,081,736 B2
(45) Date of Patent: Jul. 25, 2006

(54) ATTACHMENT APPARATUS WITH SUCTION CUP

(75) Inventors: Oliver Duncan Seil, Pasadena, CA (US); Ernesto Quinteros, Los Angeles, CA (US); Vijendra Nalwad, Newbury Park, CA (US)

(73) Assignee: Belking Corporation, Compton, CA (US)

( * ) Notice: Subject to any disclaimer, the term of this patent is extended or adjusted under 35 U.S.C. 154(b) by 317 days.

(21) Appl. No.: 10/701,099

(22) Filed: Nov. 3, 2003

(65) Prior Publication Data

US 2005/0093510 A1    May 5, 2005

(51) Int. Cl.
*H01M 10/46* (2006.01)
(52) U.S. Cl. .................................... 320/114
(58) Field of Classification Search ............... 320/107, 320/112, 114, 115, 116
See application file for complete search history.

(56) References Cited

U.S. PATENT DOCUMENTS

| | | | | |
|---|---|---|---|---|
| 3,343,772 A * | 9/1967 | Howell et al. | ........... | 248/205.5 |
| 4,539,516 A * | 9/1985 | Thompson | ........... | 320/101 |
| 5,717,398 A * | 2/1998 | Pollin | ........... | 342/20 |
| 6,779,765 B1* | 8/2004 | Zheng et al. | ........... | 248/206.3 |
| 6,883,930 B1* | 4/2005 | Saban et al. | ........... | 362/200 |
| 6,888,940 B1* | 5/2005 | Deppen | ........... | 379/446 |

* cited by examiner

*Primary Examiner*—Edward H. Tso
(74) *Attorney, Agent, or Firm*—Bryan Cave LLP

(57) ABSTRACT

In one embodiment of the invention, an attachment apparatus (100) for attaching a first device to a second device includes a cradle (110) and a suction cup (120) removably attached to the cradle. As an example, the first device can be a battery pack (400) for an electronic device. The cradle includes a major surface (111), a first sidewall (112) coupled to the major surface, a second sidewall (113) coupled to the major surface opposite the first sidewall, and a hole (114) in the major surface. The suction cup is attached to the cradle at the hole.

25 Claims, 4 Drawing Sheets

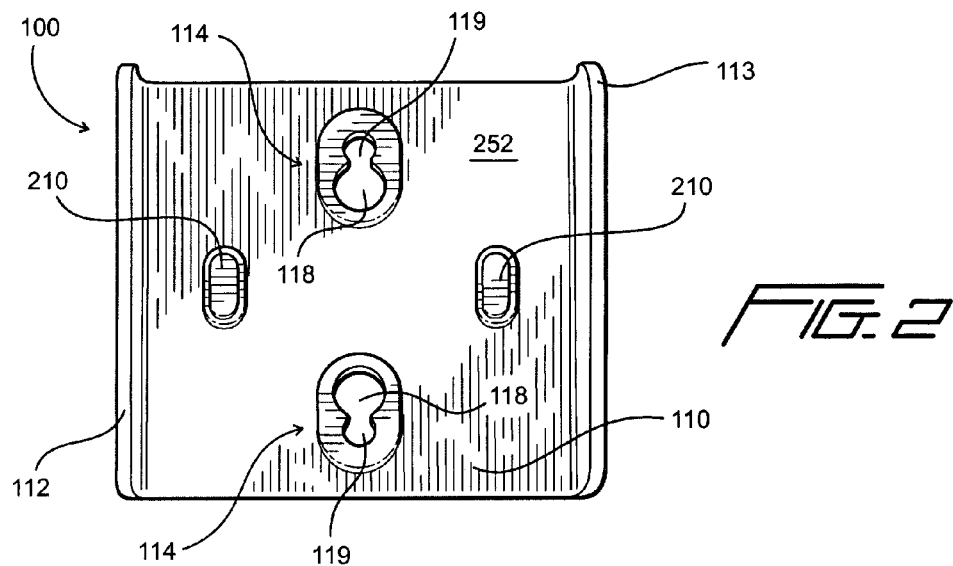
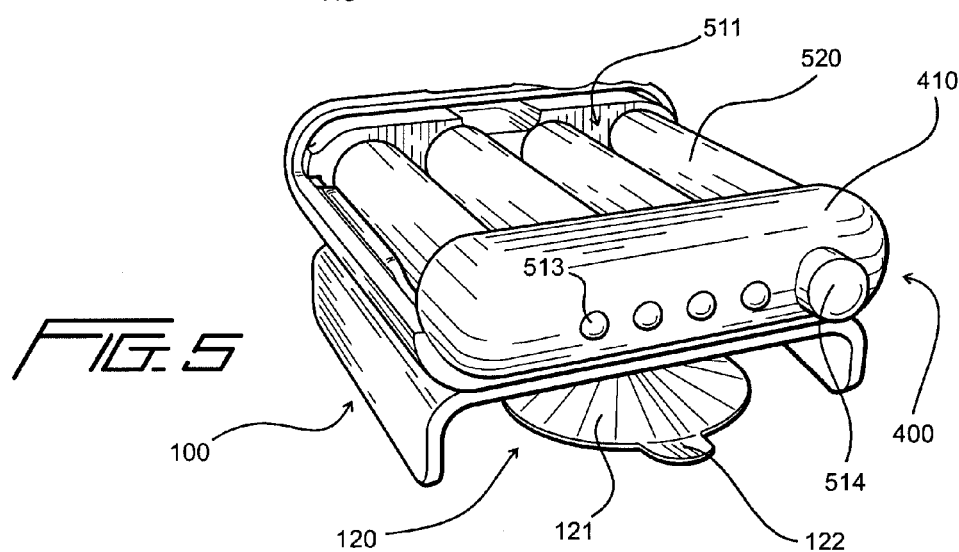
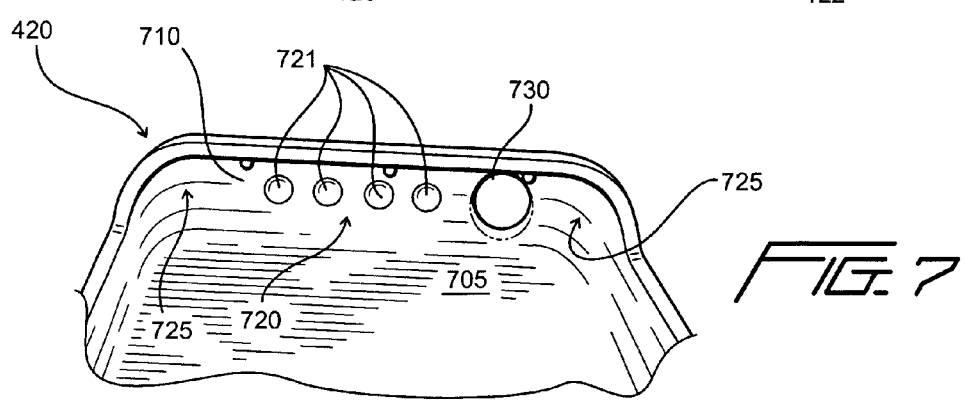

ATTACHMENT APPARATUS WITH SUCTION CUP

FIELD OF THE INVENTION

This invention relates generally to attachment apparatus, and relates more particularly to attachment apparatus for use in attaching electronic devices to each other.

BACKGROUND OF THE INVENTION

It is sometimes desirable to physically attach a first electronic device to a second electronic device adapted to enhance the functionality of the first electronic device. Existing attachment mechanisms do a poor job of providing such physical attachment while simultaneously maintaining visibility of and access to the various controls, readouts, and indicators on the electronic devices. Accordingly, there exists a need for an attachment apparatus capable of providing a secure attachment between a first electronic device and a second electronic device but does not interfere with the controls or other features of the electronic devices to which a user may need visual or manual access.

BRIEF DESCRIPTION OF THE DRAWINGS

The invention will be better understood from a reading of the following detailed description, taken in conjunction with the accompanying figures in the drawings in which:

FIG. 2 is an isometric view of a portion of the attachment apparatus according to an embodiment of the invention;

FIGS. 4 and 5 are isometric views of the attachment apparatus attached to a battery pack according to an embodiment of the invention;

FIG. 7 is an isometric view of a portion of a cover of the battery pack according to an embodiment of the invention;

Figure 1:
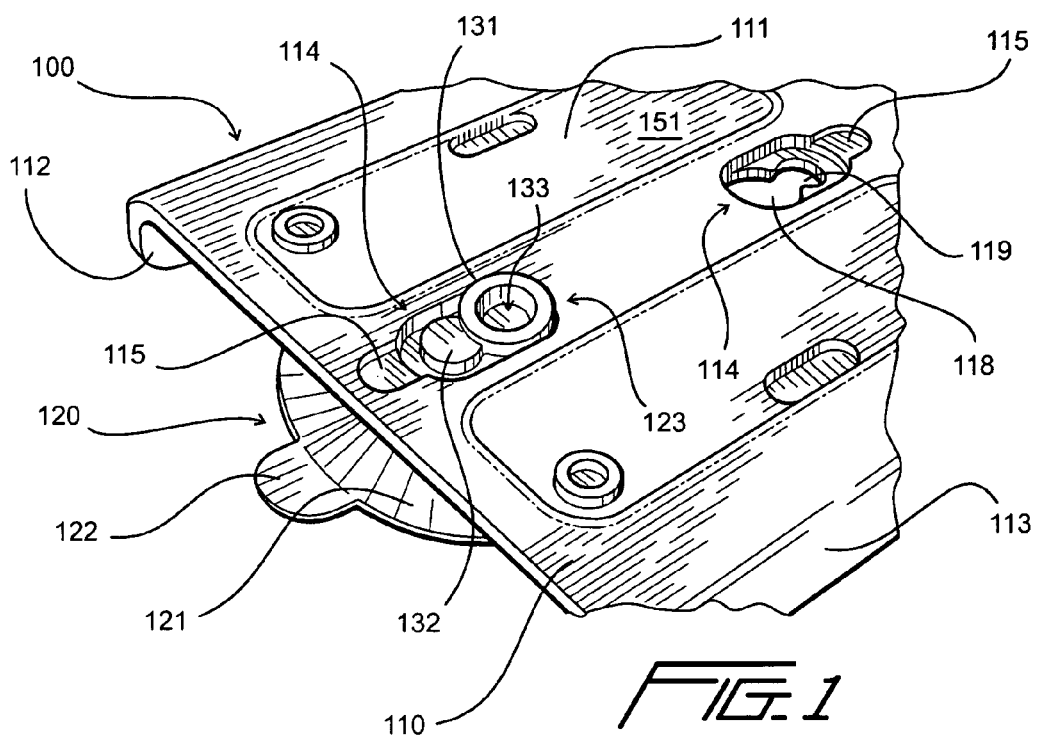
FIG. 1 is an isometric view of an attachment apparatus according to an embodiment of the invention.

For simplicity and clarity of illustration, the drawing figures illustrate the general manner of construction, and descriptions and details of well-known features and techniques may be, omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

In one embodiment of the invention, an attachment apparatus for attaching a first device to a second device comprises a cradle and a suction cup removably attached to the cradle. As an example, the first device can be a battery pack for an electronic device. The cradle comprises a major surface, a first sidewall coupled to the major surface, a second sidewall coupled to the major surface opposite the first sidewall, and a hole in the major surface. The suction cup is coupled to the cradle at the hole.

FIG. 1 is an isometric view of an attachment apparatus 100 according to an embodiment of the invention. FIG. 2 is an isometric view of a portion of attachment apparatus 100 according to an embodiment of the invention. Attachment apparatus 100 can be used to attach a first device to a second device. Referring to FIGS. 1 and 2, attachment apparatus 100 comprises a cradle 110 and a suction cup 120. Cradle 110 comprises a major surface 111, a sidewall 112 coupled to major surface 111, a sidewall 113 coupled to major surface 111 opposite sidewall 112, a hole 114 in major surface 111, and a pad 210. Pad 210 can be adjacent to hole 114. Sidewalls 112 and 113 can be perpendicular or substantially perpendicular to major surface 111, or sidewalls 112 and 113 can be oriented at some other angle with respect to major surface 111. Major surface 111 has a side 151, visible in FIG. 1, and a side 252, visible in FIG. 2. Side 151 of major surface 111 has a depression 115. In one embodiment, sidewall 112, sidewall 113, and pad 210 protrude from side 252 of major surface 111. As an example, pad 210 can increase friction between attachment apparatus 100 and a device to which attachment apparatus, 100 is attached, thus increasing the security of such attachment. As another example, pads 210 can reduce or prevent scratching of one or both of attachment apparatus 100 and the device to which it is attached.

Referring still to FIG. 1, suction cup 120 comprises a suction pad 121, a release tab 122 located at an edge of suction pad 121, and a knob 123 attached to suction pad 121. As an example, release tab 122 can be used to release the vacuum developed by suction pad 121 so that suction cup 120 can be removed from a surface to which it is attached. Suction pad 121 is concave in order to provide an area in which a suitable vacuum may be developed. Knob 123 comprises a primary portion 131 and a secondary portion 132 extending from primary portion 131. Primary portion 131 has a depression 133 therein. In one embodiment, as described more fully below, depression 133 can be cone-shaped, hemispherical, or the like in order to receive a locking feature. As an example, depression 133 can be concave in a direction opposite the direction in which suction pad 121 is concave.

Figure 3:
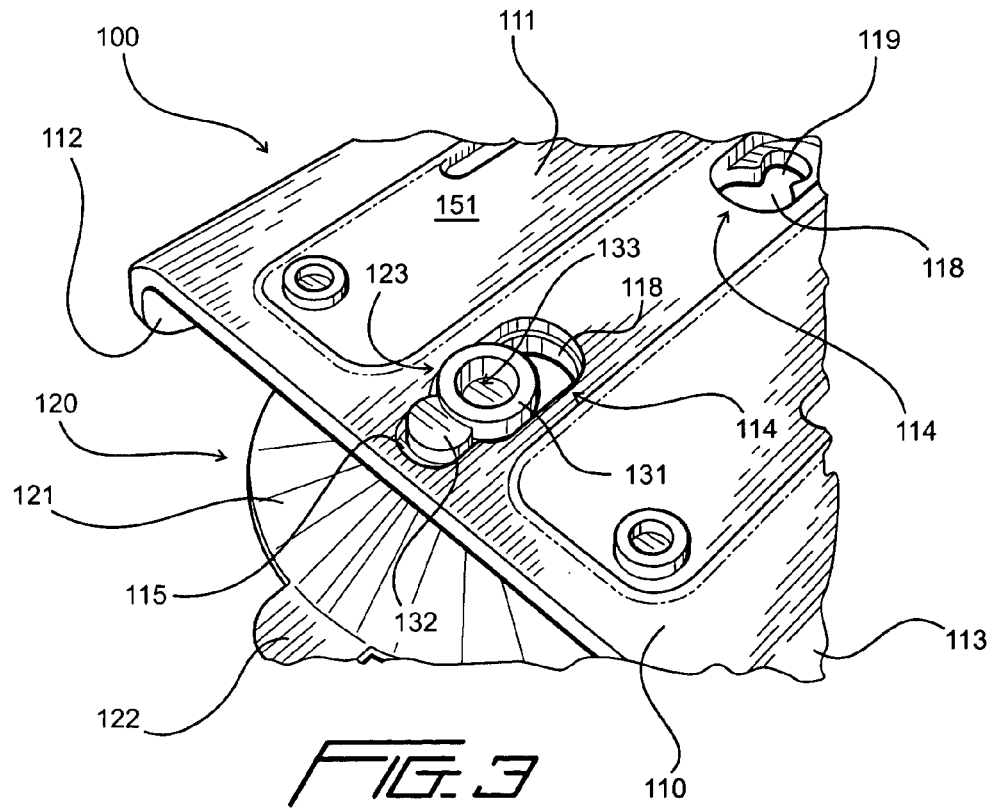
FIG. 3 is an isometric view of the attachment apparatus according to an embodiment of the invention.

FIG. 3 is an isometric view of attachment apparatus 100 according to an embodiment of the invention. Referring to FIGS. 1–3, hole 114 comprises a primary opening 118 and a secondary opening 119 coupled to and/or communicating with primary opening 118. Secondary opening 119 is smaller than primary opening 118. Secondary opening 119 and primary opening 118 function with knob 123 to allow suction cup 120 to be securely, but removably, coupled to cradle 110 at hole 114, as will now be more fully described. As seen in FIG. 1, primary portion 131 of knob 123 is inserted through primary opening 118 of hole 114, and secondary portion 132 of knob 123 is inserted through secondary opening 119 of hole 114. As seen in FIG. 3, after the insertion of primary portion 131 and secondary portion 132 into hole 114 as described above, primary portion 131 of knob 123 is moved into secondary opening 119 of hole 114 such that secondary portion 132 of knob 123 rests in depression 115. With secondary portion 132 resting in depression 115, suction cup 120 is prevented from rotating in either direction, thereby helping to assure that release tab 122 of suction cup 120 remains accessible to a user of attachment apparatus 100. If release tab 122 were allowed to rotate; it would possibly rotate underneath cradle 110, speaking from the perspective of FIGS. 1 and 3, to a position where it would not be accessible if attachment apparatus 100 were attached to a device in accordance with an embodiment of the invention.

Figure 4:
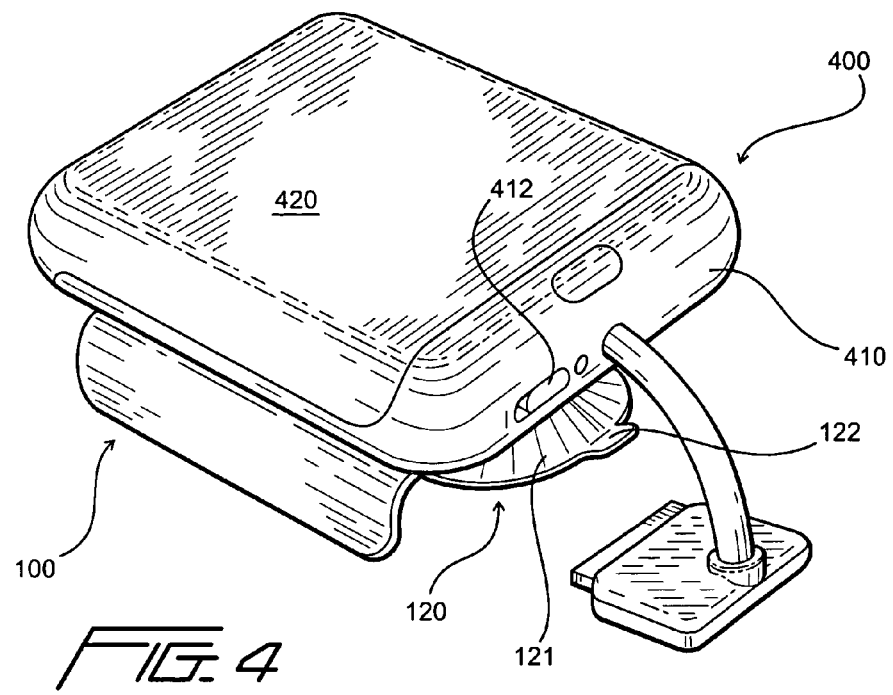

FIGS. 4 and 5 are isometric views of attachment apparatus 100 attached to a battery pack 400 according to an embodiment of the invention. Battery pack 400 is just one example of a device to which attachment apparatus 100 may be attached and many other such devices will be apparent to one of ordinary skill in the art. Referring to FIGS. 4 and 5, battery pack 400 comprises a battery module 410 and a cover 420 removably attached to battery module 410. FIG. 5 shows battery pack 400 with cover 420 removed to expose batteries 520. Battery module 410 comprises a battery compartment 511, an on/off switch 412, a charge indicator 513, and a charge indicator actuator 514. When it is in place attached to battery module 410, cover 420 encloses battery compartment 511.

As disclosed above, attachment apparatus 100 facilitates the attachment of a first device to a second device, and battery pack 400 is one example of one of such devices. In one embodiment, a second device, to which battery pack 400 or another device may be attached via attachment apparatus 100, contains batteries of its own. In that embodiment, on/off switch 412 gives a user of attachment apparatus 100 control over whether to use battery power from battery pack 400 or from the second device. In at least one embodiment, power drawn from batteries 520 of battery pack 400 is separate from power drawn from the batteries of the second device, meaning that when the second device is drawing power from its own batteries, batteries 520 are not being depleted, and vice versa. In that embodiment, when on/off switch 412 is turned to the off position, the second device is powered by its own batteries, if power is available in those batteries, and when on/off switch 412 is turned to the on position, the second device is powered by batteries 520, provided that power is available in batteries 520.

Charge indicator 513 provides an indication regarding the remaining charge left in batteries 520. In one embodiment, charge indicator 513 provides such an indication when charge indicator actuator 514 is actuated. In the same or another embodiment, charge indicator 513 can be one or more light emitting diodes (LEDs), and charge indicator actuator 514 can be a push-button switch. As an example, the actuation of charge indicator actuator 514 may cause charge indicator 513 to indicate a charge level of batteries 520: (1) only for a given length of time; or (2) until charge indicator actuator 514 is actuated again. Alternatively, charge indicator 513 can continuously indicate a charge level of batteries 520.

In a particular embodiment, charge indicator 513 can comprise a group of four LEDs that light up according to the remaining voltage level in batteries 520. For example, all four LEDs may light up to indicate a voltage level between approximately seventy-five and one hundred percent of a maximum voltage level, where a maximum, voltage level is defined as the voltage level of a set of new, unused batteries. Continuing the example, three of the four LEDs may light up to indicate a voltage level between approximately fifty and seventy-five percent of maximum, two of the four LEDs may light up to indicate a voltage level between approximately twenty-five and fifty percent of maximum, one of the four LEDs may light up to indicate a voltage level between approximately one and twenty-five percent of maximum, and none of the LEDs may light up when less than approximately one percent of the maximum voltage level remains in batteries 520. Different voltage levels and/or illumination patterns may also be used.

Figure 6:
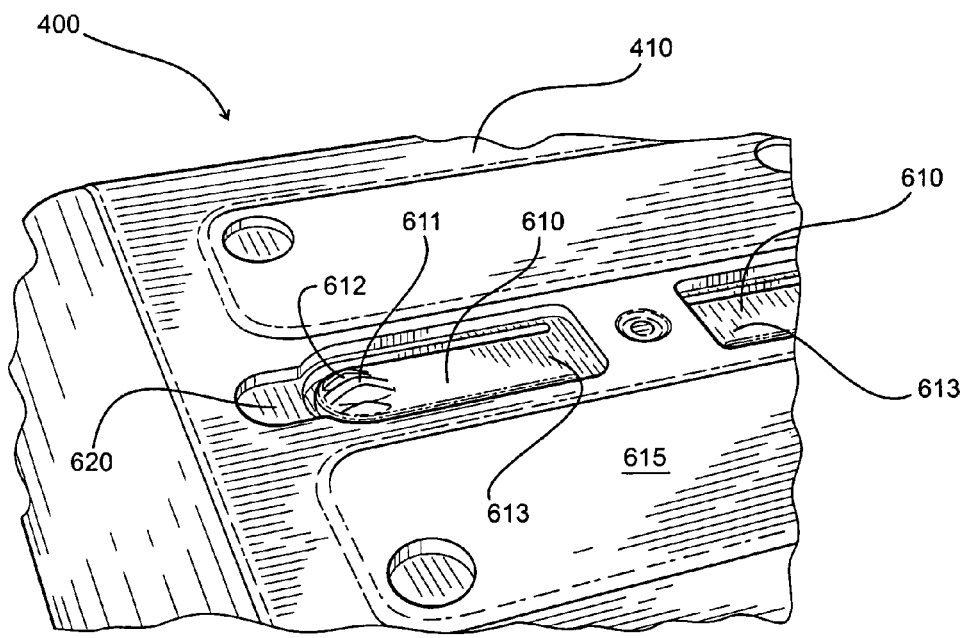
FIG. 6 is an isometric view of a portion of a battery module of the battery pack according to an embodiment of the invention.

FIG. 6 is an isometric view of a portion of battery module 410 of battery pack 400 according to an embodiment of the invention. As illustrated in FIG. 6, battery pack 400 further comprises a cantilever arm 610 coupled to battery module 410 at a side 615 of battery module 410. Side 615 of battery module 410 is located opposite battery compartment 511 (FIG. 5) of battery module 410. Battery pack 400 still further comprises a depression 620 at side 615 of battery module 410 and adjacent to cantilever arm 610. Cantilever arm 610 comprises a locking tab 611 at an end 612 of cantilever arm 610.

Cantilever arm 610, locking tab 611, and depression 620 function to securely hold suction cup 120 in place when suction cup 120 is attached to cradle 110. Consider a situation in which battery pack 400 is attached to attachment apparatus 100, as illustrated in FIGS. 4 and 5, and further in which suction cup 120 is inserted in hole 114 in the manner illustrated in FIG. 3. Locking tab 611 will then extend or protrude into depression 133 (FIGS. 1 and 3) of suction cup 120, thus helping to lock or secure suction cup 120 in place by increasing the effort necessary to move depression 133 off of locking tab 611. Additionally, depression 620 receives secondary portion 132 (FIGS. 1 and 3) of knob 123 (FIGS. 1 and 3) such that secondary portion 132 rests in depression 620 in a manner similar to that described above with respect to secondary portion 132 and depression 115. Accordingly, secondary portion 132 is held within the combination of depressions 115 and 620, with the effect that knob 123 is prevented from rotating in either direction, as described above, even more surely than would be the case if only one of depressions 115 and 620 were present in attachment apparatus 100 and battery pack 400.

End 612 of cantilever arm 610 is detached from battery module 410 and is thus free to flex or move in a direction substantially perpendicular to side 615 of battery module 410. An end 613 of cantilever arm 610, in contrast, is anchored to side 615 of battery module 410. As an example, the flexibility of cantilever arm 610, while not negating the effectiveness of the securing features just described, can function to ease the removal of suction cup, 120 from hole 114, when such removal is desired. More specifically, by flexing away from suction cup 120, and into surface 615, cantilever arm 610 pulls locking tab 611 at least part way out of depression 133, thus making it easier to move suction cup 120 off of and away from locking tab 611.

FIG. 7 is an isometric view of a portion of cover 420 according to an embodiment of the invention. A surface 705 of cover 420 is visible in FIG. 7. Surface 705 is adjacent to, and faces, battery compartment 511 when cover 420 is attached to battery module 410. As illustrated in FIG. 7, cover 420 comprises an overhang 710 having a portion 720 and a portion 725. As an example, portion 720 can be a thin portion of overhang 710 and portion 725 can be a thick portion of overhang 710, meaning portion 720 can be thinner than portion 725. Portion 720 covers charge indicator 513 when cover 420 is attached to battery module 410, and charge indicator 513 is visible through portion 720. In a particular embodiment, portion 720 comprises four distinct indentations 721, corresponding to and aligned with the four LEDs present in one of the embodiments of charge indicator 513 described above. A hole 730 in overhang 710 receives charge indicator actuator 514 (FIG. 5) when cover 420 is attached to battery module 410.

Figure 8:
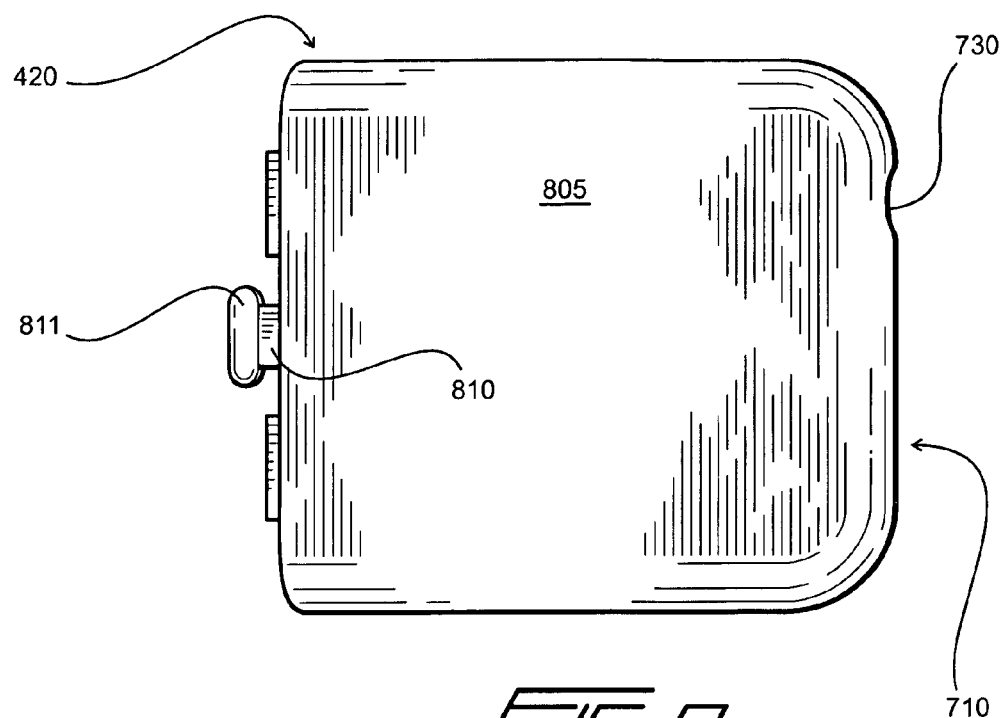
FIG. 8 is a top view of the cover of the battery pack according to an embodiment of the invention.
Figure 9:
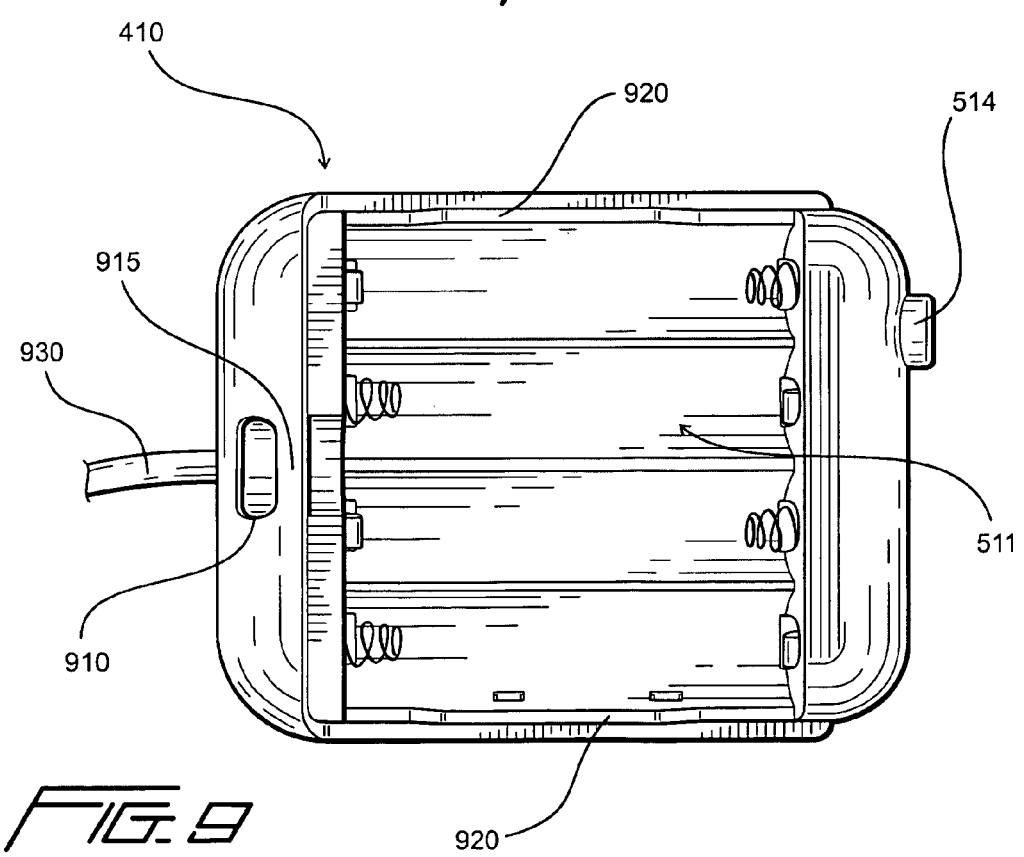
FIG. 9 is a top view of the battery module according to an embodiment of the invention.

FIG. 8 is a top view of cover 420 according to an embodiment of the invention. FIG. 9 is a top view of battery module 410 according to an embodiment of the invention. Referring to FIGS. 8 and 9, cover 420 further comprises a flexible extension arm 810. A surface 805 of cover 420 is shown in FIG. 8, which surface 805 is opposite surface 705 (FIG. 7). Referring still to FIGS. 8 and 9, extension arm 810 comprises a locking head 811, and battery module 410 comprises a bridge 915 and a hole 910 for receiving locking head 811 and securing cover 420 to battery module 410, and thus to battery pack 400 (FIGS. 4 and 5). To attach cover 420 to battery module 410, a user of attachment apparatus 100 and battery pack 400 passes locking head 811 underneath bridge 915 and snaps locking head 811 into place within hole 910, thus securely engaging cover 420 with battery module 410. To remove cover 420 from battery module 410, the user of attachment apparatus 100 and battery pack 400 applies a force to locking head 811 in order to flex or depress locking head 811 out of and away from hole 910. Once locking head 811 has been removed form hole 910, cover 420 may be removed form battery module 410 thus exposing battery compartment 511. In one embodiment, battery module 410 further comprises rails 920. As an example, rails 920 can guide cover 420 as cover 420 slides along battery module 410 during the engagement procedure described above. Other embodiments, in which cover 420 is removed and attached without sliding along battery module 410, are also possible.

In one embodiment, battery module 410 further comprises a cable 930. As an example, cable 930 can be used to make an electrical connection between battery pack 400 or another device and a second device to which battery pack 400 or the other device is attached.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the attachment apparatus discussed herein may be implemented in a variety of embodiments, and that the foregoing discussion of certain of these embodiments does not necessarily represent a complete description of all possible embodiments.

All elements claimed in the claims are essential to the invention, and replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An attachment apparatus for attaching a first device to a second device, the attachment apparatus comprising:
   a cradle comprising:
      a major surface;
      a first sidewall coupled to the major surface;
      a second sidewall coupled to the major surface opposite the first sidewall; and
      a hole in the major surface; and
   a suction cup coupled to the cradle at the hole,
   wherein:
      the suction cup comprises:
         a suction pad; and
         a knob attached to the suction pad; and
      the knob comprises:
         a primary portion; and
         a secondary portion extending from the primary portion.

2. The attachment apparatus of claim 1 wherein:
   the suction cup further comprises a release tab located at an edge of the suction pad; and
   the primary portion has a depression therein.

3. The attachment apparatus of claim 2 wherein:
   the hole comprises:
      a primary opening; and
      a secondary opening coupled to the primary opening.

4. The attachment apparatus of claim 1 wherein the cradle further comprises:
   a pad protruding from the major surface.

5. The attachment apparatus of claim 1 wherein:
   the first device is a battery pack.

6. The attachment apparatus of claim 5 wherein:
   the battery pack comprises:
   a battery module comprising:
      a battery compartment; and
      an on/off switch; and
   a cover enclosing the battery compartment and removably attached to the battery module.

7. The attachment apparatus of claim 6 wherein:
   the battery module further comprises a charge indicator.

8. The attachment apparatus of claim 6 wherein:
   the battery module further comprises a charge indicator actuator.

9. The attachment apparatus of claim 6 wherein:
   the battery pack further comprises:

a cantilever arm coupled to the battery module opposite the battery compartment; and
a depression in the battery module opposite the battery compartment and adjacent to the cantilever arm; and
the cantilever arm comprises a locking tab.

10. The attachment apparatus of claim 6 wherein:
the cover comprises a first portion;
the first portion covers the charge indicator when the cover is attached to the battery module; and
the charge indicator is visible through the first portion.

11. The attachment apparatus of claim 6 wherein:
the cover further comprises:
an extension arm; and
the battery pack further comprises:
a hole for receiving at least a portion of the extension arm and securing the cover to the battery pack.

12. A battery pack for attachment to an electronic device, the battery pack comprising:
a battery module;
a cover removably coupled to the battery module;
a cradle coupled to the battery module; and
a suction cup removably coupled to the cradle,
wherein:
the suction cup comprises:
a suction pad;
a release tab located at an edge of the suction pad; and
a knob attached to the suction pad; and
the knob comprises:
a primary portion having a depression therein and extending through the hole; and
a secondary portion extending from the primary portion.

13. The battery pack of claim 12 wherein:
the battery module comprises:
a battery compartment;
an on/off switch; and
a charge indicator; and
the cover encloses the battery compartment.

14. The battery pack of claim 13 wherein:
the battery module further comprises a charge indicator actuator adjacent to the battery compartment.

15. The battery pack of claim 12 wherein:
the cover further comprises:
an extension arm; and
the battery pack further comprises:
a hole for receiving at least a portion of the extension arm and securing the cover to the battery pack.

16. The battery pack of claim 12 wherein:
the cradle comprises:
a major surface;
a pad protruding from the major surface in a first direction;
a first sidewall coupled to the major surface and extending in the first direction;
a second sidewall coupled to the major surface opposite the first sidewall and extending in the first direction; and
a hole in the major surface; and
the suction cup is removably coupled to the cradle through the hole.

17. The battery pack of claim 16 wherein:
the hole comprises:
a primary opening; and
a secondary opening coupled to the primary opening.

18. The battery pack of claim 13 wherein:
the battery pack further comprises:
a cantilever arm coupled to the battery module opposite the battery compartment; and
a depression in the battery module opposite the battery compartment and adjacent to the cantilever arm; and
the cantilever arm comprises a locking tab.

19. The battery pack of claim 18 wherein:
the cover comprises a first portion;
the first portion covers the charge indicator when the cover is attached to the battery module; and
the charge indicator is visible through the first portion.

20. An attachment apparatus for attaching a battery pack to an electronic device, the attachment apparatus comprising:
a cradle comprising:
a major surface;
a first sidewall coupled to the major surface;
a second sidewall coupled to the major surface opposite the first sidewall; and
a hole in the major surface; and
a suction cup removably attached to the cradle at the hole;
wherein:
the battery pack comprises:
a battery module comprising:
a battery compartment;
an on/off switch;
a charge indicator; and
a charge indicator actuator;
a cable coupled to the battery module; and
a cover enclosing the battery compartment removably attached to the battery module; and
the suction cup comprises:
a suction pad; and
a knob attached to the suction pad; and
the knob comprises:
a primary portion; and
a secondary portion extending from the primary portion.

21. The attachment apparatus of claim 20 wherein:
the battery pack further comprises:
a cantilever arm attached to the battery module opposite the battery compartment; and
a depression in the battery module opposite the battery compartment and adjacent to the cantilever arm; and
the cantilever arm comprises a locking tab.

22. The attachment apparatus of claim 20 wherein:
the suction cup comprises:
a vacuum release tab located at an edge of the suction pad; and
the primary portion of the knob has a depression therein.

23. The attachment apparatus of claim 20 wherein:
the cover comprises a thick portion and a thin portion;
the thin portion covers the charge indicator when the cover is attached to the battery module; and
the charge indicator is visible through the thin portion.

24. The attachment apparatus of claim 20 wherein:
the hole comprises:
a primary opening; and
a secondary opening communicating with the primary opening.

25. The attachment apparatus of claim 20 wherein:
the cover further comprises:
an extension arm; and
the battery pack further comprises:
a hole for receiving at least a portion of the extension arm and securing the cover to the battery pack.

* * * * *